United States Patent
Close et al.

(10) Patent No.: US 8,824,241 B2
(45) Date of Patent: Sep. 2, 2014

(54) METHOD FOR A PRESSURE RELEASE ENCODING SYSTEM FOR COMMUNICATING DOWNHOLE INFORMATION THROUGH A WELLBORE TO A SURFACE LOCATION

(76) Inventors: David Close, Austin, TX (US); Paul Deere, Austin, TX (US)

( * ) Notice: Subject to any disclaimer, the term of this patent is extended or adjusted under 35 U.S.C. 154(b) by 885 days.

(21) Appl. No.: 13/018,212

(22) Filed: Jan. 31, 2011

(65) Prior Publication Data
US 2011/0169655 A1      Jul. 14, 2011

Related U.S. Application Data

(63) Continuation-in-part of application No. 12/685,602, filed on Jan. 11, 2010, now Pat. No. 7,881,155.

(51) Int. Cl.
*E21B 47/16* (2006.01)
(52) U.S. Cl.
USPC ............. 367/83; 367/84; 367/85; 340/853.1; 340/854.3; 175/48; 175/61
(58) Field of Classification Search
CPC ................................. E21B 47/18; E21B 47/12
USPC ........... 367/83–85; 340/853.1, 854.3; 175/48, 175/61
See application file for complete search history.

(56) References Cited

U.S. PATENT DOCUMENTS

| | | |
|---|---|---|
| 3,867,714 A | 2/1975 | Patton |
| 4,520,468 A | 5/1985 | Scherbatskoy |
| 4,562,560 A | 12/1985 | Kamp |
| 5,473,579 A | 12/1995 | Jeter |
| 5,586,084 A | 12/1996 | Barron et al. |
| 5,679,894 A | 10/1997 | Kruger et al. |
| 6,097,310 A | 8/2000 | Harrell et al. |
| 6,105,690 A | 8/2000 | Biglin, Jr. |
| 6,443,228 B1 | 9/2002 | Aronstam et al. |
| 6,691,804 B2 | 2/2004 | Harrison |
| 6,714,138 B1 | 3/2004 | Turner et al. |
| 6,898,150 B2 | 5/2005 | Hahn |
| 7,145,834 B1 | 12/2006 | Jeter |
| 7,319,638 B2 | 1/2008 | Collette |
| 7,417,920 B2 | 8/2008 | Hahn et al. |
| 7,881,155 B2 * | 2/2011 | Close ............................. 367/83 |

* cited by examiner

*Primary Examiner* — Albert Wong
(74) *Attorney, Agent, or Firm* — Andrew W. Chu; Craft Chu PLLC

(57) ABSTRACT

A method for a pressure release encoding system for communicating downhole information through a wellbore to a surface location includes positioning a valve and a brake in a drilling mud circulation system, initiating flow of drilling mud through the system, sensing flow through the valve and setting the brake at predefined pressure levels, sensing downhole conditions and releasing corresponding percentages of pressure across the valve at time intervals, and determining the downhole conditions at the surface by analyzing those associated time intervals. The method includes activation of the encoding system using drilling mud flow and setting predefined pressure levels, so that the pressure drops in the encoding process are from predefined levels at equilibrium and independent of fluid flow.

15 Claims, 4 Drawing Sheets

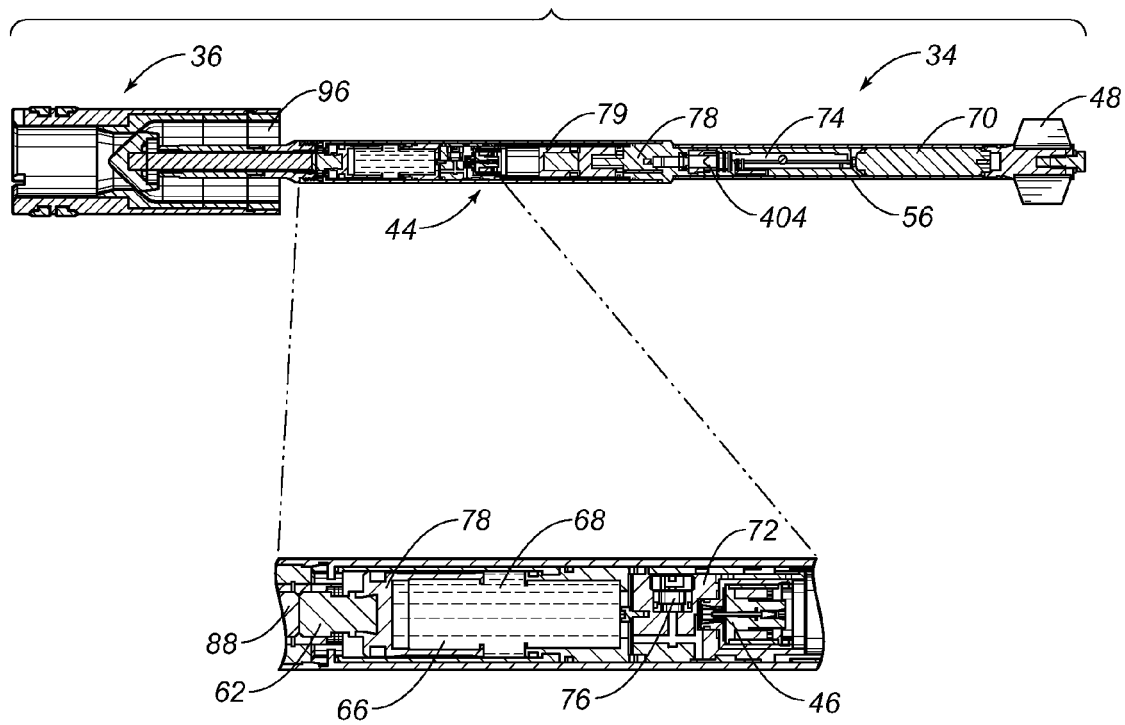
FIG. 7
FIG. 8
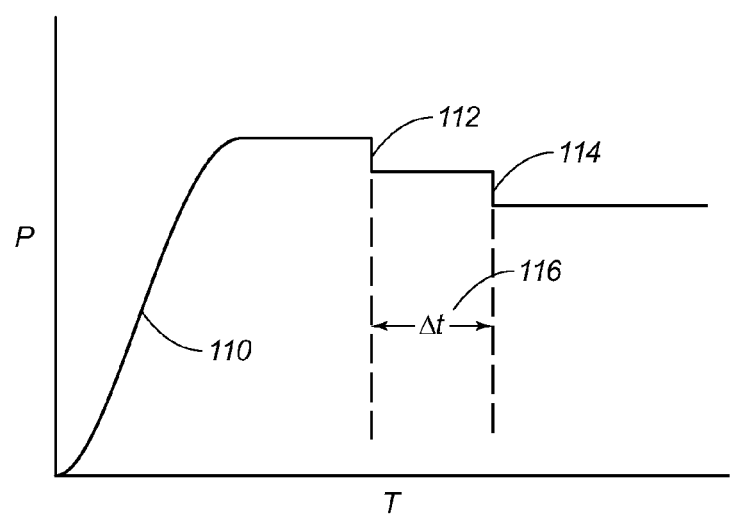
FIG. 9

METHOD FOR A PRESSURE RELEASE ENCODING SYSTEM FOR COMMUNICATING DOWNHOLE INFORMATION THROUGH A WELLBORE TO A SURFACE LOCATION

CROSS-REFERENCE TO RELATED APPLICATIONS

The present application claims continuation-in-part priority under 35 U.S.C. §120 from U.S. Ser. No. 12/685,602, filed on Jan. 11, 2010, and entitled "PRESSURE RELEASE ENCODING SYSTEM FOR COMMUNICATING DOWNHOLE INFORMATION THROUGH A WELLBORE TO A SURFACE LOCATION".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a system and method for transmitting information from a downhole location to surface location. More particularly, the present invention relates to a system and method for communicating the inclination angle at the bottom of a wellbore to a surface location in a generally real-time fashion without the need for wirelines or remote transmission. The present invention also relates to the association of pressure transducer measurements to monitor pressure changes as a method of transmission of information.

2. Description of Related Art Including Information Disclosed Under 37 CFR 1.97 and 37 CFR 1.98.

In underground drilling, such as gas, oil or geothermal drilling, a bore is drilled through a formation deep in the earth. Such bores are formed by connecting a drill bit to sections of long pipe, referred to as a "drill pipe," so as to form an assembly commonly referred to as a "drill string" that extends from the surface to the bottom of the borehole. The drill bit is rotated so that it advances into the earth, thereby forming the bore. In rotary drilling, the drill bit is rotated by rotating the drill string at the surface. In directional drilling, the drill bit is rotated by a downhole mud motor coupled to the drill bit. In a steerable drill string, the mud motor is bent at a slight angle to the centerline of the drill bit so as to create a side force that directs the path of the drill bit away from a straight line. The drill pipe is rotated slowly so as to avoid being stuck to the formation. The drill pipe is not the main source of the drill bit rotation. In any event, in order to lubricate the drill bit and flush cuttings from its path, pumps on the surface pump fluid referred to as "drilling mud", at a high pressure, through an internal passage in the drill string and out through the drill bit. The drilling mud then flows to the surface through the annular passage formed between the drill string and the cut formation borehole.

Depending on the drilling operation, the surface measured pressure of the drilling mud flowing through the drill string will typically be between 500 psi and 5000 psi. Some of this pressure is lost at the drill bit so that the pressure of the drilling mud flowing outside the drill string is less than that flowing inside the drill string. In addition, the components of the drill string are also subjected to wear and abrasion from drilling mud, as well as the vibration of the drill string.

The distal end of a drill string is the bottom hole assembly (BHA), which includes the drill bit, the drilling sub and drill collars. In "measurement while drilling" (MWD) applications, sensing modules in the BHA provide information concerning the direction of the drilling. This information can be used, for example, to control the direction in which the drill bit advances in a steerable drill string. Such sensors may include magnetometers and accelerometers to sense inclination, azimuth and tool face orientation.

Historically, information concerning the conditions in the well, such as information about the formation being drilled through, was obtained by stopping drilling, and lowering sensors into the bore through the center of the drill pipe using a wireline cable, which were then retrieved after the measurements had been taken. This approach was known as wireline logging. More recently, sensing modules have been incorporated into the BHA to provide the drill operator with essentially real-time information concerning one or more aspects of the drilling operation as the drilling progresses. In "logging while drilling" (LWD) applications, the drilling aspects about which information is supplied comprise characteristics of the formation being drilled through. For example, resistivity sensors may be used to transmit, and then receive, high frequency wavelength signals (e.g., electromagnetic waves) that travel through the formation surrounding the sensor. By comparing the transmitted and received signals, information can be determined concerning the nature of the formation through which the signal traveled, such as whether it contains water or hydrocarbons. Other sensors are used in conjunction with magnetic resonance imaging (MRI). Still other sensors include gamma scintillators, which are used to determine the natural radioactivity of the formation, and nuclear detectors, which are used to determine the porosity and density of the formation.

In traditional LWD and MWD systems, electrical power is supplied either by a turbine driven by the mud flow or a, battery modules. In both LWD and MWD systems, the information collected by the sensors must be transmitted to the surface, where it can be analyzed. Such data transmission is typically accomplished using a technique referred to as "mud pulse telemetry." In a mud pulse telemetry system, signals from the sensor modules are typically received and processed in a microprocessor-based data encoder embodied in a collar as part of the BHA, which digitally encodes the sensor data. A controller in the control module then actuates a pulser, also incorporated into the BHA, that generates pressure pulses within the flow of drilling mud that contains the encoded information. The pressure pulses are defined by a variety of characteristics, including amplitude (the difference between the maximum and minimum values of the pressure), duration (the time interval during which the pressure is increased), shape, and frequency (the number of pulses per unit time). Various encoding systems have been developed using one or more pressure pulse characteristics to represent binary data (i.e., bit 1 or 0)—for example, a pressure pulse of 0.5 second duration represents binary 1, while a pressure pulse of 1.0 second duration represents binary 0. The pressure pulses travel up the column of drilling mud flowing down to the drill bit, where they are sensed by a strain gauge-based pressure transducer. The data from the pressure transducer are then decoded and analyzed by the drilling rig operating personnel.

In the past, various patents have issued relating to the transmission of downhole conditions to a surface location. U.S. Pat. No. 3,867,714, issued on Feb. 18, 1975 to B. J. Patton, describes a logging-while-drilling (LWD) system, which is positioned within the drill string of a well drilling apparatus. The system includes a tool which has a turbine-like, signal-generating valve which rotates to generate a pressure wave signal in the drilling fluid which is representative of a measured downhole condition.

U.S. Pat. No. 4,520,468, issued on May 28, 1985 to S. A. Scherbatskoy, provides measurement-while-drilling (MWD) systems. The measurements are transmitted to the earth by a pulser, which produces common responses to electrical signals from a measuring instrument, and pressure pulses in the drilling fluid which are detected and decoded at the surface of the earth. The pulser is mounted in a special pulser sub which is of short length and enlarged internal diameter compared to the standard drill sub and which is threadedly secured at each end to the BHA collars. drill string. An elongated housing is supported by the pulser sub. This elongated housing contains instrumentation or batteries and is connected to the pulser.

U.S. Pat. No. 4,562,560, issued on Dec. 31, 1985 to A. W. Kamp, provides a method and means for transmitting data through a drill string in a borehole. The data is in the form of pressure waves (such as pressure pulses) which are generated by means of a downhole mud motor that is driven by the drilling mud. The pressure waves are generated by varying the load on the mud motor according to a predetermined pattern that is representative of the data to be transmitted.

U.S. Pat. No. 5,679,894, issued on Oct. 21, 1997 to Kruger et al., describes a drilling system in which sensors are placed at selected locations in the drill string so as to continually measure various downhole operating parameters, including the differential pressure across the mud motor, rotational speed of the mud motor, torque, temperature, pressure differential between the fluid passing through the mud motor and the annulus between the drill string and the borehole, and the temperature of the circulating fluid. A downhole control circuit has a microprocessor so as to process signals from the sensors and transmit the process data uphole to a surface control unit by way of suitable telemetry.

U.S. Pat. No. 6,105,690, issued on Aug. 22, 2000 to Biglin, Jr. et al., provides a method and apparatus for communicating with a device downhole in a well, such as a sub in the BHA at the end of the drill string. Pressure pulses, such as those generated by the pistons of the mud pump, are transmitted through the drilling mud to a pressure pulsation sensor in the BHA. Based on its analysis of the pressure pulsations, the sensor can decipher a command from the surface so as to direct the steering of a steerable drill string.

U.S. Pat. No. 6,443,228, issued on Sep. 3, 2002 to Aronstam et al., is a method for utilizing flowable devices in wellbores. These flowable devices are used to provide communication between surface and the downhole instruments so as to establish a communication network in the wellbore. The flowable devices are adapted to move with a fluid flowing in the wellbore. The flowable device can be a memory device or a device that can provide a measurement of a parameter of interest. The flowable devices are introduced into the flow of a fluid flowing through a wellbore. The fluid moves the device in the wellbore. The flowable device is returned to the surface with the returning fluid.

U.S. Pat. No. 6,691,804, issued on Feb. 17, 2004 to W. H. Harrison, describes a directional borehole drilling system and method. Instrumentation located near the bit measures the present position when the bit is static and a dynamic tool face measures position when the bit is rotating. The data is processed to determine the error between present position and a desired trajectory.

U.S. Pat. No. 6,714,138, issued on Mar. 30, 2004 to Turner et al., discloses a method and apparatus for transmitting information to the surface from downhole in a well in which a pulser is incorporated into the BHA of a drill string, the pulser generating pressure coded pulses to contain information concerning the drilling operation. The pressure pulses travel to the surface where they are detected and decoded so as to decipher the information. The pulser includes a stator forming passages through which drilling fluid flows on its way to the drill bit. The rotor has blades that obstruct the flow of the drilling fluid through the passage when the rotor is rotated into a first orientation and when rotated into a second orientation, such that the oscillation of the rotor generates the encoded pressure pulses. An electric motor, under the operation of a controller, drives a drive train that oscillates the rotor between the first and second orientation. The controller controls one or more characteristics of the pressure pulses by varying the oscillation of the rotor. The controller may receive information concerning the characteristics of the pressure pulses from a pressure sensor mounted proximate to the BHA, as well as information concerning the angular orientation of the rotor by means of an encoder. The controller may also receive instructions for controlling the pressure pulse characteristics from the surface by means of encoded pressure pulses transmitted to the pulser from the surface that are sensed by the pressure sensor and decoded by the controller.

U.S. Pat. No. 6,898,150, issued on May 24, 2005 to Hahn, teaches a hydraulically balanced reciprocating pulser valve for mud pulse telemetry. Pressure fluctuations are generated by a reciprocating pulser system in a flowing drilling fluid. The system includes a reciprocating poppet and a stationary valve assembly with axial flow passages. The poppet reciprocates in close proximity to the valve assembly, at least partially blocking the flow through the valve assembly and generating oscillating pressure pulses. The poppet passes through two zero speed positions during each cycle, enabling rapid changes in signal phase, frequency, and/or amplitude thereby facilitating enhanced data encoding. The poppet is driven by a linear electric motor disposed in a lubricant filled housing.

Conventional downhole tools, MWD tools and steering tools typically will use a dedicated mud pulser (valve) that requires a large amount of power to actuate the valve and modulate the mud pressures in a manner that can be detected with a pressure transducer at the surface. These tools use mud pulsers or other means to generate oscillatory signals or mud pulses that create decreases and corresponding increases in the mud circulatory system. The significant proportion of the energy associated with conventional MWD pressure signals is the part of the signal waveform that increases the pressure of the system, whereas the part of the signal waveform that releases the system pressure uses a very small amount of energy. This invention capitalizes upon the energy savings associated with the pressure release encoded system that only releases pressures in the circulatory system as a transmission means. MWD tools are cost prohibitive as a means of transmitting the direction of the borehole when drilling vertical boreholes. Typically, periodic measurement of the "verticality of the well" is required by measuring the inclination of the borehole as the well is drilled deeper. Most vertically drilled wells use a cost-effective mechanical "drift indicator" that is lowered via a wireline into the well to make the inclination measurements at the required depth and pulled out of the hole to read the inclination. Mechanical drift tools are currently being replaced by newer electronic drift indicators. Thus, the industry has a need for a cost effective tool that can send inclination information to the surface without requiring the stopping of the drilling operation and the running of the wireline tool into the wellbore. A "real-time" tool that could replace wireline tools would have to be compact, relatively inexpensive, be robust and have a long operational life.

It is an object of the present invention to provide a cost effective system for communicating downhole information to the surface.

It is another object of the present invention to provide a method of sensing flow to activate the encoding system for communicating downhole information.

It is another object of the present invention to provide a method that uses flow as a switch for activating and de-activating the encoding system.

It is a further object of the present invention to provide a pressure release encoding system and method, which minimizes the amount of power for activating the system for transmission of pressure information to the surface.

It is a further object of the present invention to extend the battery life of the system by making use of the oil rig mud pumps as the primary energy source of the pressure release encoded system, thus enabling the system of the present invention to activate the encoding system and to progressively release the pressure across the float valve in an energy efficient manner.

It is a further object of the present invention to use a brake as a control and a differential pressure sensor as a control feedback source to accurately dictate the desired differential pressure drop across the valve.

It is a further object of the present invention to use a pressure sensor within a hydraulic brake to detect a pressure level at a first position.

It is a further object of the present invention to use a brake to standardize a desired differential pressure across the valve.

It is a further object of the present invention to use a brake to derive a predetermined differential pressure across the valve independent of fluid density and fluid velocities.

It is a further object of the present invention to use a return spring within the hydraulic brake to close the main valve once the drilling interval has been completed and the mud pumps are turned off.

These and other objects and advantages of the present invention will become apparent from a reading of the attached specification and appended claims.

BRIEF SUMMARY OF THE INVENTION

The present invention is a system for communicating downhole information through a wellbore to a surface location. This system comprises a valve for providing a flow restriction to fluid passing in the wellbore, a sensor positioned in the wellbore for sensing a downhole condition in the wellbore, a brake device being cooperative with the valve and restricting the valve from fully opening during the commencement of fluid flow in at least in two fixed positions that are a timed relation to the downhole condition sensed by the sensor, and a detector positioned at the surface location and cooperative with the fluid passing in the wellbore for providing a measurement value at the surface location correlative to the time between the changes of the pressure of the fluid in the wellbore.

The system of the present invention further includes a drilling sub interconnected between the drill collars and the drill bit. The valve and brake device are positioned within the drilling sub.

The valve includes a float valve that is mounted in the drilling sub in a manner suitable for controlling flow of drilling mud in the wellbore. The float valve is normally used for controlling only reverse flow in the BHA, which is disclosed in the prior art. The present invention utilizes a ruggedized float valve to restrict the fluid flow therethrough using a pressure release encoding system. The brake device serves to hold the float valve in at least two partially open positions to create fixed pressure drops across the valve at the commencement of fluid flow through the drilling sub. The float valve, in particular, includes a housing positioned in the drilling sub, a valve seat and valve member slidably movable in the housing with a piston stem connected to the piston of the valve and extending outwardly of the housing. The brake piston of the brake member bears on the piston stem opposite the piston of the float valve so as to impede an axial advancement of the piston of the valve so as to move the piston of the float valve in the housing in timed relation between the two positions. In particular, the brake device or brake member includes an actuatable brake piston movable between a first fixed position and a second fixed position representing two predetermined fixed pressure drops across the valve.

A pumping means is positioned at the surface location for pumping drilling mud into the wellbore. The detector serves to detect a change of pressure of the drilling mud. A logic system correlates the sensed time between the changes of pressure to the downhole condition. A display serves to provide a generally real-time humanly perceivable indication of this downhole condition.

In the preferred embodiment of the present invention, the sensor is an inclination sensor for sensing an angle of inclination of the drilling sub. It is this angle of inclination of the drilling sub, which is the downhole condition of well bore inclination. The logic system serves to correlate the sensed time between pressure drops to the angle of inclination.

The present invention includes the pressure release encoding system using a method of communicating within a wellbore that comprises the steps of: (1) sensing a quiet downhole condition corresponding to a non-pumping and non-drilling rig operation; (2) sensing a quantifiable downhole condition; (3) sensing the commencement of mud flow due to the starting of the mud pumps (4) forming a flow restriction within the circulation system in the wellbore; (5) using a brake device to govern the quantified pressure restriction of the drilling mud in the circulation system; (6) measuring the force at the brake control device proportional to the differential pressure across the flow restriction; (7) using a brake control means to form a predetermined first steady state flow restriction; (8) releasing a first percentage of the pressure within the flow restriction at a first time; (9) releasing a second percentage of the pressure within the flow restriction at a second time such that the time between the first time and the second time is correlative of the downhole conditions; and (10) determining the downhole condition at a surface location by sensing the time between the changes of pressure; and (11) increasing the flow restriction to the original state when the flow through the flow restriction has returned to zero.

In the method of the present invention, the valve means is a ruggedized float valve positioned in the fluid passageway in the drilling sub. The float valve creates the flow restriction. Additionally, a hydraulic brake is positioned in the drilling sub such that a hydraulic brake piston cooperates with the float valve piston rod. The hydraulic brake piston is controlled via a solenoid pilot valve allowing a processor command to release the float valve to a partially open static position corresponding to a desired pressure drop across the float valve. After a pre-determined steady state pressure has been established across the float valve, the float valve is allowed to further open to a first fixed position and then a second fixed position so as to cause the float valve to release the first percentage of pressure and the second percentage of pressure. The step of detecting includes measuring a time between the release of the first percentage of pressure and the release of the second percentage of pressure and then correlated this time to the downhole condition.

In the preferred method of the present invention, the step of sensing includes sensing an angle of inclination of a drill bit within the wellbore. A time value is assigned to the sensed angle of inclination. The brake allows the float valve to open to a first fixed position and the second fixed position at a time equal to the assigned time value.

The present application claims the subject matter of activating the encoding system, setting the brake positions for the pressure drops, and setting a first brake position based on a predetermined pressure level. The steps of encoding are claimed in a related patent application. The present steps were also disclosed in the related patent application.

These and other objects and advantages of the present invention will become apparent from a reading of the attached specification and appended claims.

BRIEF DESCRIPTION OF THE SEVERAL VIEWS OF THE DRAWINGS

FIG. 7 is a cross-sectional view of the present invention, showing the float valve, hydraulic brake, electronics system and end centralizer.

FIG. 8 is an exploded and isolated cross-sectional view of the hydraulic brake of FIG. 7.

FIG. 9 is a graph illustration, showing the sensing of timed pressure changes.

DETAILED DESCRIPTION OF THE INVENTION

Figures 1, 2:
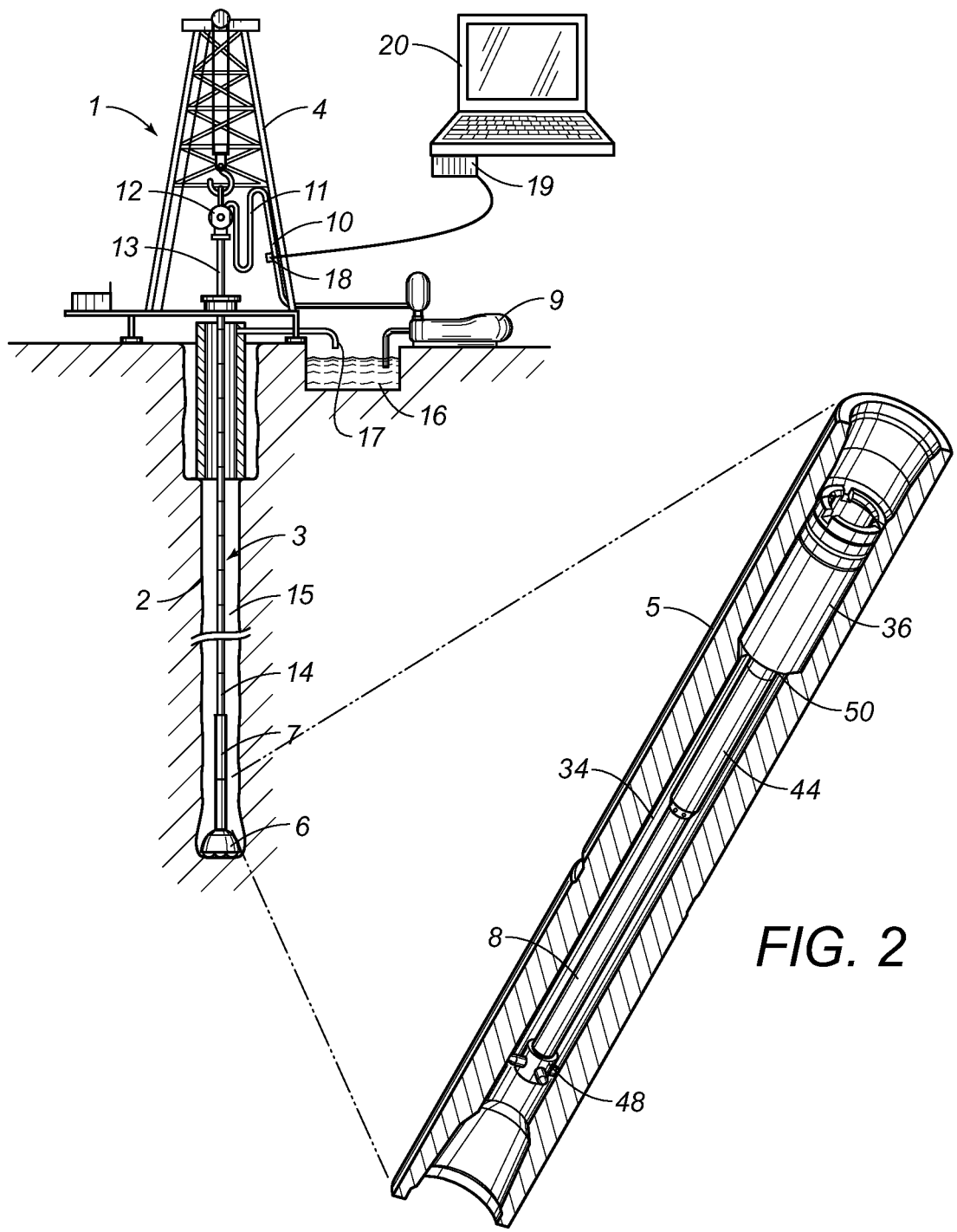
FIG. 1 is a schematic view illustrating the system of the present invention in association with components of a conventional drilling rig, showing the relative location of the present invention.
FIG. 2 is a partial sectional view, showing the drilling sub and present invention in relation to the drill string.

FIG. 1 illustrates the system 1 of the present invention, including a conventional drilling rig located at a site above the borehole 2. The drill string 3 is supported by the derrick 4 and includes drill collars 7 and a drill bit 6. A float valve 36 resides inside the drill sub 5. The system 1 includes a downhole electronics module 8 also resides inside the drill sub 5 and includes a hydraulic brake 44, an inclination sensing device and a processing device. The downhole electronics module 8 is described in greater detail in FIG. 2.

The system 1 includes a pumping means, usually comprised of a drilling rig with a mud pump system. The flow of the mud pump system is generated by mud pumps 9 through the stand pipe 10, the mud hose 11, the swivel 12, the kelly 13, down the drill pipe 14, through the drill collars 7 and drill sub 5. Mud then exits out through the drill bit 6 and travels up the annulus 15 of the wellbore 2 to the surface where it is carried back to the mud pit 16 by way of a conduit 17.

The pressure of the mud that passes through the mud pump system is monitored by a pressure sensor 18 at the surface location, which is mounted on the stand pipe 10. The pressure sensor 18 conveys the pressure of the mud pump system to a surface computer 20 via a wired interface box 19.

The downhole electronics module 8 of the present invention measures the wellbore inclination every time the mud pump 9 transitions from an on-state to an off-state creating a quiet downhole environment to record the inclination measurement. All information gathered by the electronics module tool 8 will be saved to the internal memory of the electronics module 8. This information can be retrieved later after the downhole electronics module 8 is brought to the surface.

In the present invention, when specifically directed, the information gathered by the downhole electronics module 8 is communicated via the pressure sensor 18, through the wired interface box 19, to the surface computer 20, through the mud pump system by way of a pressure release communications method. This innovative pressure release communications method is initiated when the mud pump system is turned on and the resulting flow through the valve means is detected by downhole electronics module 8. The present invention enables the downhole electronics module 8 to automatically activate and de-activate according to the status of the drilling. For example, vibration due to the drilling process can cause the tool to power down; thus, no downhole conditions are being sensed during the power down. Then, the lack of drilling vibration can cause the tool to wake up.

On the next off-cycle of the pumps of the mud pump system, the downhole tool 8 measures the wellbore inclination as the downhole condition and activates the pressure transducer that detects the start of the mud flow through the float valve 36. A hydraulic brake restricts the opening of the float valve 36 in a controlled routine dictated by electronics system 34. On the next on-cycle of the pumps of the mud pump system, pressure will be generated across the float valve 36 because of its restricted movement. The mud pump system will also generate a pressure observed by the surface computer 20 by way of the interface box 19 to the pressure sensor 18 mounted on the stand pipe 10.

The hydraulic brake 44 also contains a pressure sensing device sensed by electronic module 8. Once the downhole electronics module 8 has established a stable pressure across the float valve 36, it will release the hydraulic brake 44 so as to allow the float valve 36 to partially open. The encoding system has now been activated. When a portion of the pressure across the float valve 36 has been released, the downhole electronics module 8 will reactivate the hydraulic brake 44 so as to stop the opening of float valve 36. This reduction of pressure across the float valve 36 will be seen throughout the mud pump system and will be transmitted to the surface computer 20 via interface box 19 and pressure transducer 18 on the stand pipe 10.

After a period of time that is proportional to the inclination of the wellbore 2, and as described hereinafter, the downhole electronics module 8 will deactivate the hydraulic brake 44 so as to allow the remaining pressure across the float valve 36 to be released. This second release of pressure will be seen at the surface computer 20 just as the first release of pressure was observed by the surface computer 20. The time between the first release of pressure across the float valve 36 and the second release of pressure across the float valve 36 is proportional to the inclination of the wellbore 2. This time between pressure releases is measured by the surface computer 20. This information is used to calculate the inclination of the wellbore and is displayed to an operator.

FIG. 2 is a cut-away view showing the drilling sub 5 that is secured to an end of the drill collars 7 and drill string 14. The drilling sub 5 includes an interior passageway extending axially longitudinally therethrough. A float valve 36 is positioned to one end of the drilling sub 5 within the fluid passageway as the valve means of the present invention. The float valve 36 itself is a modified float valve that is commonly used on drilling subs in the prior art. As such, the present invention does not significantly modify the basic construction of the drilling sub 5 or a particular float valve 36. However, in the present invention, the system includes a downhole electronics module 8 including a float valve 36 and a hydraulic brake 44 placed within the fluid passageway so as to provide a proper action onto the float valve 36 so as to allow changes of pressure in the drilling mud to be provided in timed relation to the downhole condition. This arrangement is not disclosed by the prior art.

The drilling sub 5 has a threaded connection at one end and another threaded connection at an opposite end. One connection is suitable for joining with the drill bit the opposite threaded connection is suitable for joining with the drill collars. The float valve 36 is positioned on a hanger seat 50 a conventional bore back machined in the internal diameter of drilling sub 5. This method securing float valve 36 and sealing the float valve 36 with seals 54 within drilling sub 5 is commonly used in the prior art.

The downhole electronics module 8 is assembled with an actuator section 44 and a stabilizer/centralizer 48 positioned at one end of the electronic section 34 opposite the hydraulic brake 44. A hanger 50 serves to position float valve 36 and electronics module 8 in alignment with the float valve 36. Within the concept of the present invention, the determination of the pressure sensing device can be easily accomplished by installing the downhole electronics module 8 within a conventional or slightly modified drill sub 5. Besides pressure sensing, other types of downhole conditions at the brake may be used to communicate through the downhole electronics module 8 for purposes of activating or calibrating the encoding through pressure drops.

Figure 3:
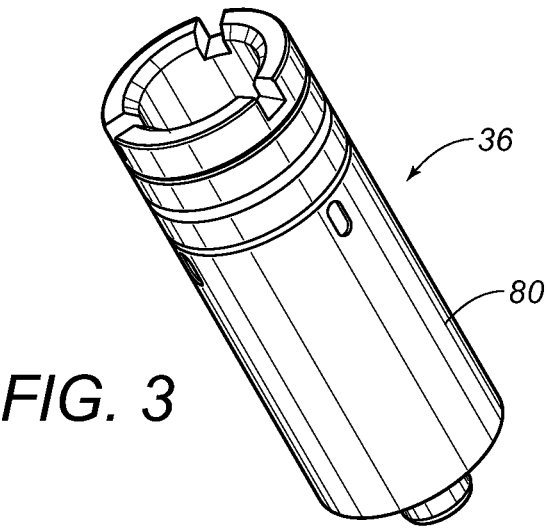
FIG. 3 is a detailed perspective view of the valve means of the present invention.

FIG. 3 is a more detailed three-dimensional illustration of valve means or flow valve assembly 36 of the present invention. The preferred embodiment of the invention utilizes a strengthen float valve assembly 36 above conventional float valves to allow for the additional forces and wear demands associated with the controlled flow restrictions demanded by the invention. A standard float valve housing form has been improved. A ceramic seat lining 82 protects the valve housing from erosion when fluid passes along opening 100 through the float valve housing 80. Valve poppet 92 can slide axially and outwardly from seat 82 via shaft 88 within ceramic bushings 98 and 99 held in association with valve housing 80. Upper ceramic bushing 98 and lower ceramic bushing 99 centralize shaft 88 from potentially damaging vibrations caused by the forces resulting from restricting flow through aperture 100.

Figure 6:
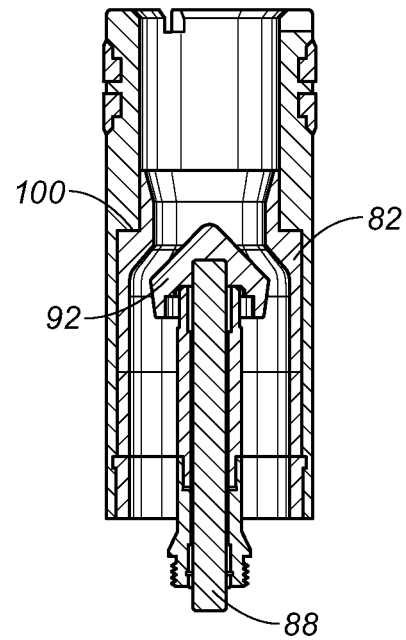
FIG. 6 is a cross-sectional view of the float valve in a semi-open attitude.
Figure 5:
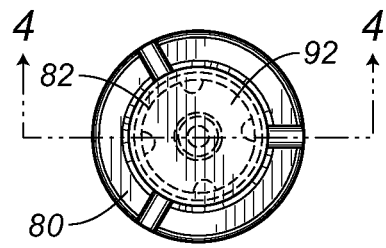
FIG. 5 is a top plan view of the float valve of FIG. 4.

FIG. 6 is a cross sectional illustration of float valve 36 with valve poppet 92 in a semi open position in relation to seat 82 within float valve housing 80. Valve shaft 88 associated with poppet 92 is displaced outwardly from valve adaptor 96 when poppet 92 is displaced off its seat due to flow through aperture 100.

Figure 4:
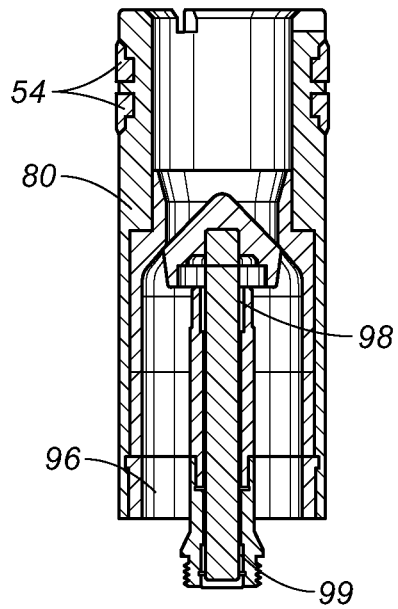
FIG. 4 is a cross-sectional view of the float valve in a closed attitude.

FIG. 4 is a cross sectional illustration of float valve 36 with valve poppet 92 in a closed position in relation to seat 82 within float valve housing 80. FIG. 3 shows an end view of the float valve 36.

FIG. 7 is cross-sectional view of a portion of the downhole electronics module 8 in accordance with the teachings of the preferred embodiment of the present invention. There is an electronic section 34, the hydraulic brake section 44 and a float valve 36. The stabilizer/centralizer 48 is provided at one end of the downhole electronics module 8. It is this hydraulic brake section 44 which serves to impart the necessary action onto the float valve 36 so as to allow the present invention to carry out its intended purpose.

FIG. 8 illustrates an expanded cross-sectional view of the hydraulic brake means 44 for further clarification of the preferred embodiment of the invention. The hydraulic brake 44 includes a generally tubular body, extending longitudinally from the stabilizer/centralizer 48 at one end to the float valve 36 with adaptor 96 at the opposite end. The hydraulic brake section 44 includes the hydraulic actuator piston 78 fixed to piston rod 62 extends outwardly of brake housing 44. The piston rod has end 62 suitable for abutting the piston stem 88 of the float valve 36 (in the manner to be described hereinafter). Piston 78 has hydraulic oil 68 inserted rearwardly within the interior of the hydraulic chamber of section 44.

A control manifold 72 uses a solenoid pilot valve 46 to control the flow of oil through the manifold 72. When piston 78 is pushed by the poppet shaft 88 of float valve 36, oil 68 is displaced through manifold 72 via solenoid control valve 46 positioned within the manifold. If control valve 46 is closed, oil 68 will be prevented from flowing through manifold 72, hydraulically locking piston 62 and poppet shaft 88 from moving in the presence of mud flow through float valve 36.

Hydraulic brake 44 is hydraulically compensated via compensating piston 79 that moves accordingly and compliantly with piston 78. A return spring 66 is incorporated into the oil filled space 68 so as to return the hydraulic brake piston 78, and float valve 36 into its retracted position when fluid flow through float valve 36 has ceased.

A differential pressure transducer 76 is housed in manifold 72 to measure the differential pressure across manifold 72. The electronic section 34 includes a battery assembly 70 located within the interior of the electronic section 34. An inclination sensor 404 is placed adjacent to the electronics 74 and rearwardly of the hydraulic brake section 44. A high-pressure electrical bulkhead 78 will be positioned between the actuator section 44 and the electronic section 34.

In the present invention, the inclination sensor 404 is of a type presently available and utilized within the prior art for downhole conditions. The electronics 74 are similarly available in the prior art. The electronics will process the information from the inclination sensor 404 so as to provide an output that would indicate the orientation of the drill bit within the wellbore. However, unlike the prior art, the system of the present invention has electronics 74 suitably connected to solenoid valve 46. As such, the electronics 74 of the present invention will serve to hydraulically control the reseeding of the piston 78 to a first position and a second position in timed relation. The timed relation can be based upon the angular inclination of the drill bit. For example, the movement between the first position and the second position can be a one second interval if the angular inclination is one degree. Alternatively, if the angular inclination is two degrees, then the interval between the movement of the first reseeded position and the second further reseeded position of the hydraulic brake 78 can be two seconds. Still further, if there is a five degree angle of inclination, then the time interval between the first reseeded position and the second further reseeded position can be five seconds. As will be described hereinafter, these controlled restrictions of float valve opening will cause pressure static pressure changes in the drilling mud that can be sensed from the surface location. As such, if the pressure changes would occur two seconds apart, then the operator would know that there was a two degree angle of inclination. Various fractional angles can also be conveyed in a similar manner from the downhole condition to the surface location. All of the electronics are self-contained within the downhole electronics module 8. As a result, no wireline connections are necessary to the surface location and no telemetry systems are required.

FIGS. 7 and 8 illustrate the operation of the downhole electronics module 8, also referred to as the downhole tool, in the preferred embodiment of the invention. The downhole tool can take a survey during the normal rig operation of connecting an additional drill pipe. Then, the rig pumps are turned off the fluid flow through a valve means, such as a flow valve 36, ceases, the resulting axial force from the poppet shaft 88 and hydraulic brake piston shaft 62 is reduced allowing spring 66 to return the float valve to a closed position. Once the electronics or tool electronics system 74 senses a quiet condition associated with a non drilling condition via a shock sensor or accelerometer. The tool electronics system 74 measures the inclination of the system via inclination sensor 404. The inclination measurement is stored in the electronics system 74 memory. When the mud pumps are started the resulting flow through float valve 36 starts to move oil through the open solenoid valve 46 housed in manifold 72. The resulting initial pressure in oil 68 is measured by pressure transducer 76 and processed by electronics system 74. The micro controller system in electronics system 74 now having detected the commencement of flow due to the starting of the rigs pumps, energizes solenoid valve 46 sealing oil flow through manifold 72. As such, rearward movement of the piston 78 is hydraulically blocked preventing the further opening of float valve 36. The simple impeding of this axial movement requires a minimum of energy. The pressure drop across partially open float valve 36 increases as the fluid flow rises. The differential pressure drop across float valve 36 can be measured by the single pressure transducer 76 downstream of float valve 36 via the resulting proportion force in shaft 88 conveying to the same force in shaft 62 and piston 78. Piston 78 loads oil 68 forming a hydraulic pressure within the oil in the brake chamber. The pressure drop across float valve 36 can be controlled during the commencement of flow to a predetermined pressure drop across the valve. Electronics 74 micro controller switches the electrical drive to hydraulic brake solenoid pilot valve 46 in a control routine cooperative with pressure sensor 76 to reach the predetermined pressure drop across float valve 36.

After electronics system 74 and pressure sensor 76 have established that a first predetermined stable static pressure has been reached, electronics system 74 will open the solenoid pilot valve allowing hydraulic oil 68 to flow through manifold 72. Piston 78 can then axially move allowing the mechanically coupled float valve 36 to open further, until electronics system 74 and pressure sensor 76 have established a second predetermined stable static pressure. This second pressure is controlled by electronics system 74 to be a programmable percentage of the first predetermined pressure. After a period of time proportionally corresponding to the prior recorded inclination measurement, electronics system 74 will open the solenoid pilot valve 46 allowing flow valve 36 to fully open.

Under certain circumstances, it may be necessary to incorporate three or more movements to the piston 78 so as to accurately and properly convey information pertaining to the downhole condition to the surface location.

FIG. 9 illustrates the manner in which the pressure release encoding of the present invention relates to the change of time of pressure changes conveyed to the surface. In FIG. 9, the horizontal axis represents time while the vertical axis represents pressure. Line 110 is illustrated as pressure building up in the system. This build-up of pressure occurs when the valve poppet 92 is seated within its seat 82 in float valve 36. Eventually, when the system pressure has equalized, the pressure will level out. When the valve poppet 92 opens, in the manner of FIG. 6, a pressure drop 112 will occur. When the valve poppet 92 opens further, another pressure drop 114 occurs. Since the cause of the pressure drops is the relay of information from the sensor, through the electronics, to the hydraulic brake, and, in turn, to the stem 88 of the valve poppet 92, the time of these pressure changes, represented by delta t 116 is correlative of the downhole condition. As stated previously, and merely as an example, if the delta t is two seconds, then the surface location will know that the drill bit has two degrees of deviation. If the delta t is 3.25 seconds, then the surface location will know that the change of orientation is 3.25°. It is believed that the system of the present invention can also be adapted to various other downhole sensor tools. In the present invention, the amount of pressure change is not very important. It is only the existence of the pressure change which is important to monitor. As such, the time between the pressure changes (regardless of the amount of pressure) provides the necessary information to the operator at the surface so as to determine the downhole condition.

Figure 10:
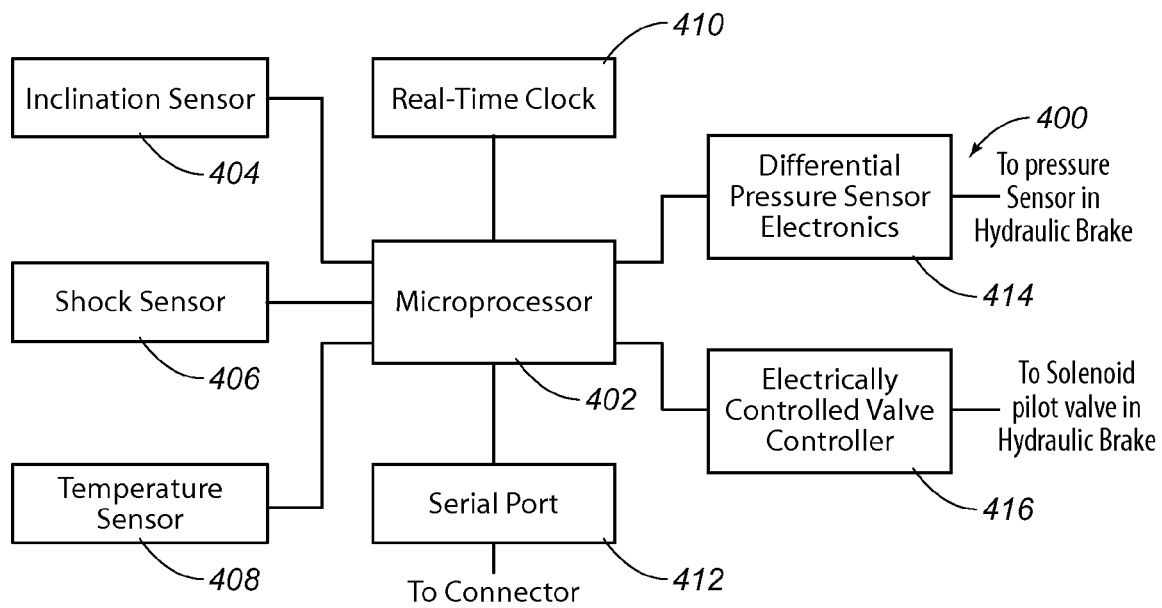
FIG. 10 is a block diagram of the microprocessor-based electronics section of the downhole tool of the present invention.

FIG. 10 shows the microprocessor-based electronic system 400 of the downhole electronics module 8. This electronic system 400 includes a microprocessor 402, an inclination sensor 404, a shock sensor 406, a temperature sensor 408, a real-time clock 410, and a serial port 412 in order to communicate outwardly of the downhole tool. The electronic system 400 also includes differential pressure sensor electronics 414 and an electrically-controlled solenoid valve controller 416. Solenoid pilot valve 46 and the pressure sensor 76 are wired to the controller and are both incorporated in manifold 72 within hydraulic brake 44.

The downhole electronics module 8 is mounted in the drill sub 5 in the manner shown in FIG. 2. When the pumps 9 in the mud pump system are turned on, drilling mud is forced down the drill string 3 into the drill sub 5 and around the downhole electronics module 8 before exiting out the drill bit 6 and returning to the surface mud pits 16 by way of the annulus 15 of the wellbore 2. Shock sensor 406 detects the shock and vibration associated with the rotary drilling of drill bit 6 cutting formation 2. When the drilling stops shock sensor 406 turns off. This stoppage wakes the microprocessor 402 from a low powered sleep state. When the microprocessor 402 wakes up, it first verifies a quiet downhole state identifying a stoppage of the drilling process, then it reads the inclination from the inclination sensor 404, the temperature from the temperature sensor 408, and the present time from the real-time clock 410. This information is stored in the electronic memory and can be retrieved at a later time by way of the serial port 412 when the downhole tool is at the surface.

After storing this information into memory, microprocessor 402 will monitor differential pressure sensor 76 via the sensor electronics 414 to detect the commencement of mud flow as described previously. Once mud flow has been detected microprocessor 402 will initiate the pressure release communication procedure also described in section (21). Once the pressure release communication procedure has been conducted the microprocessor 402 will return to its low power sleep state until the next quite event associated with the cessation of the drilling process.

The system and method of the present invention provides a cost effective system for communicating downhole directional information to the surface. The use of shock and movement sensors allow the downhole electronic module to automatically activate when in a borehole and automatically shut down when not needed, such that surface communication is not required prior to running. The activation of the mud pumps can start the readings of the downhole condition without any separate need to activate the system. The present invention uses a pressure sensor within a hydraulic brake to detect the starting of the rig mud pumps. The downhole electronics module has a return spring within the hydraulic brake to close the main valve once the drilling interval has been completed and the mud pumps are turned off.

The system and method of the present invention effectively incorporates existing elements of drilling rigs. The pressure release encoding system also increases the usefulness of existing float valves, which can be efficient adapted for the innovative method of the present invention. Furthermore, the system and method does not require significant modification of the drilling sub, which is already employed in the BHA. The system and method still allow monitoring of the downhole condition in a relatively real-time manner at a surface location.

The present invention improves energy and power usage. The pressure release encoding system minimizes the amount of power for the transmission of pressure information to the surface. Only a small amount of power is needed for the downhole module or tool of the present invention itself. The battery life of the system is extended by making use of the oil rig mud pumps as the primary energy source of the pressure release encoded system, thus enabling the system of the present invention to progressively release the pressure across the float valve in an energy efficient manner.

The system and method of the present invention disclose a hydraulic brake means, solenoid pilot valve, and only a single pressure sensor in an innovative manner. These elements control feedback to accurately dictate the desired differential pressure drop across the float valve and derive a desired differential pressure across the float valve. The single sensor in the drilling sub is an important innovation over the prior art systems with at least two sensors. The installation of two pressure sensors, sometimes on both sides of a valve means is no longer required by the present invention. Previously, the technology required two pressure transducers positioned physically below and above the pressure restriction, such as the main valve and seat. The hydraulic brake, pressure sensor and solenoid pilot valve control also derive a predetermined differential pressure across the float valve independent of fluid density and fluid velocities.

The foregoing disclosure and description of the invention is illustrative and explanatory thereof. Various changes in the details of the illustrated construction or in the steps of the described method may be made within the scope of the appended claims without departing from the true spirit of the invention. The present invention should only be limited by the following claims and their legal equivalents.

We claim:

1. A method of communicating within a wellbore, the wellbore having a drilling mud circulation system therein, the circulation system being through a drill string, a drilling sub affixed to said drill string, a drill bit and an interior of said wellbore, the method comprising:

positioning a valve means in a fluid passageway of said drilling sub;

positioning a brake with a brake piston in said drilling sub, said brake piston being cooperative with said valve means;

sensing a quantifiable downhole condition;

initiating a flow of drilling mud through said circulation system;

forming a flow restriction within the circulation system at said drilling sub, said flow restriction being said valve means;

sensing said flow of drilling mud through said valve means, wherein said valve means is opened according to a predefined pressure drop across said valve means;

activating said brake piston from a first receded fixed position to a second receded fixed position so as to allow said valve means to release a first percentage of pressure;

releasing said first percentage of pressure across said valve means within said flow restriction at a first time;

releasing a second percentage of pressure across said valve means within said flow restriction at a second time, a time between said first time and said second time being correlative to the downhole condition; and determining downhole condition changes from a surface location by sensing the time between said first time and said second time.

2. The method of communicating within a wellbore, according to claim 1, said step of activating said brake piston from said first receded fixed position comprising:

switching on a solenoid pilot valve to lock said valve means to a partially open position and said brake in a set position; and popping off said brake from said set position to said first receded fixed position, corresponding to a predetermined first starting pressure across said valve means.

3. The method of communicating within a wellbore, according to claim 1, said step of sensing said quantifiable downhole condition comprising:

sensing an angle of the drilling sub, said drilling sub being aligned with said wellbore, said downhole condition being the angle of inclination.

4. The method of communicating within a wellbore, according to claim 1, wherein the step of activating said brake piston comprises:

setting said first receded position at a first equilibrium state of said valve means before said release of said first percentage of pressure; and setting said second receded position at a second equilibrium state of said valve means, wherein the step of releasing said second percentage of pressure follows the step of setting said second receded position at said second equilibrium state of said valve means.

5. The method of communicating within a wellbore, according to claim 1, wherein said first receded fixed position corresponds to a first equilibrium state of said valve means after starting the circulation system, said second receded fixed position corresponding to a second equilibrium state of said valve means after releasing a first percentage of pressure.

6. The method of communicating within a wellbore, according to claim 4, said step of determining comprising:

measuring a time between release of said first percentage and release of said second percentage; and correlating said time to the downhole condition.

7. The method of communicating within a wellbore, according to claim 3, wherein the drilling string has a bit sub interconnected thereto, the method further comprising:
assigning a time value to a sensed angle of inclination of said bit sub; and
moving said brake between said first receded fixed position for said first release of pressure and said second receded fixed position for said second release of pressure at a time equal to said time value.

8. The method of communicating within a wellbore, according to claim 1, wherein said brake is a hydraulic brake, the hydraulic brake being comprised of a hydraulic chamber filled with oil, a sliding piston, a return spring, a control means for preventing displacement of oil when said sliding piston pushes against said oil, and a hydraulic oil pressure sensor means, and
wherein the step of activating said brake piston correlates with detection of mud flow via a pressure measurement of said oil in said hydraulic chamber by a hydraulic oil pressure sensor means from force applied by said valve means.

9. The method of communicating within a wellbore, according to claim 8, wherein said detection of mud flow is comprised of a pressure measurement cooperative with differential pressure across said valve means by said hydraulic oil pressure sensor means.

10. The method of communicating within a wellbore, according to claim 1, further comprising the step of:
increasing flow restriction to an original state when flow through the flow restriction has returned to zero.

11. A method of communicating within a wellbore, the wellbore having a drilling mud circulation system therein, the circulation system being through a drill string, a drilling sub affixed to said drill string, and an interior of said wellbore, the method comprising:
positioning a valve means in a fluid passageway of said drilling sub;
positioning a brake with a brake piston in said drilling sub, said brake piston being cooperative with said valve means;
sensing a quantifiable downhole condition;
initiating a flow of drilling mud through said circulation system;
forming a flow restriction within the circulation system at said drilling sub, said flow restriction being said valve means;
sensing said flow of drilling mud through said valve means, wherein said valve means is opened according to a predefined pressure drop across said valve means;
releasing a first percentage of pressure within said flow restriction at a first time;
releasing a second percentage of pressure within said flow restriction at a second time, a time between said first time and said second time being correlative to the downhole condition; and
determining the downhole condition at a surface location by sensing the time between said first time and said second time.

12. The method of communicating within a wellbore, according to claim 11, said step of releasing said first percentage of pressure comprising:
activating said brake piston from a first receded fixed position to a second receded fixed position, wherein said first receded fixed position is set by activating a solenoid pilot valve to lock said valve means to a partially open position and said brake in a set position and popping off said brake from said set position to said first receded fixed position, corresponding to a predetermined first starting pressure across said valve means.

13. The method of communicating within a wellbore, according to claim 11, further comprising the step of:
increasing flow restriction to an original state when flow through the flow restriction has returned to zero.

14. The method of claim 11, said step of sensing comprising:
sensing an angle of inclination of a drill bit within the wellbore, said downhole condition being the angle of inclination.

15. A method of communicating within a wellbore, the wellbore having a drilling mud circulation system therein, the circulation system being through a drill string and a drilling sub affixed to said drill string, and being movable within an interior of said wellbore, the method comprising:
positioning a valve means in a fluid passageway of said drilling sub;
positioning a brake with a brake piston in said drilling sub, said brake piston being cooperative with said valve means;
sensing a quantifiable downhole condition;
initiating a flow of drilling mud through said circulation system;
forming a flow restriction within the circulation system at said drilling sub, said flow restriction being said valve means;
sensing said flow of drilling mud through said valve means, wherein said valve means is opened according to a predefined pressure drop across said valve means and wherein said brake is placed in a set position;
popping off said brake from said set position to a first receded fixed position, corresponding to a predetermined first starting pressure across said valve means;
releasing a percentage of pressure across said valve means by activating said brake piston from said first receded fixed position to a subsequent receded fixed position at a time interval, said time interval being associated with the sensing of said quantifiable downhole condition;
repeating the sensing and releasing according to subsequent quantifiable downhole conditions at subsequent time intervals; and
determining downhole condition changes from a surface location by analysis of the time intervals.

* * * * *